Figure 1:
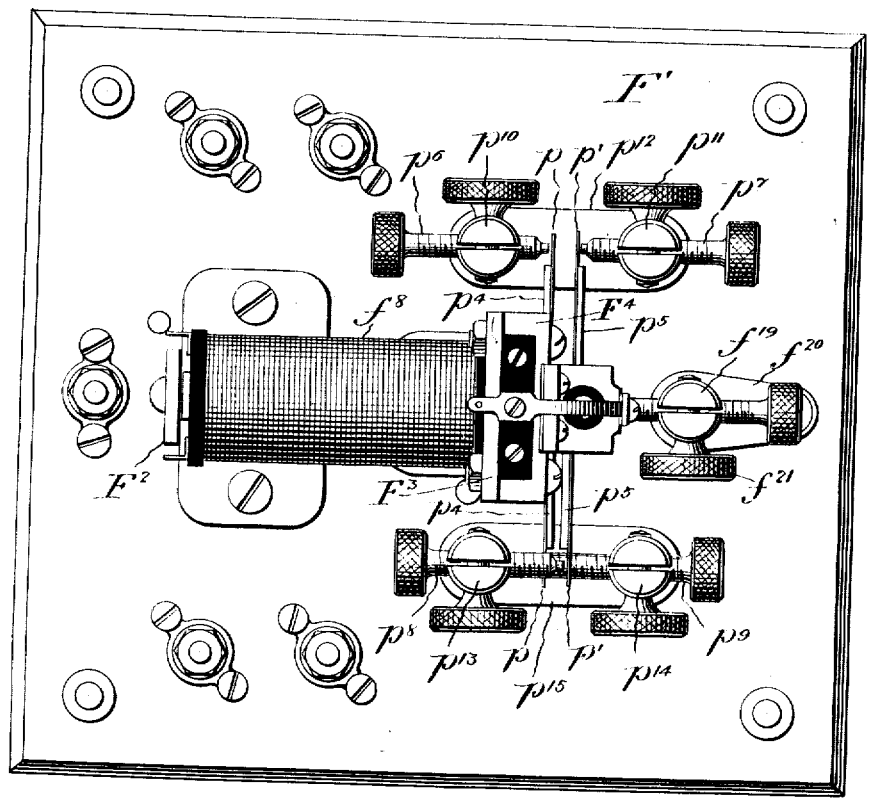

R. H. MANSON.
POLE CHANGER.
APPLICATION FILED JAN. 16, 1906.

1,023,261.

Patented Apr. 16, 1912.

2 SHEETS—SHEET 1.

Witnesses:
O. W. Edlin
Jos. L. Wright

Inventor:
Roy H. Manson
by Edward C. Clement
Att.

R. H. MANSON.
POLE CHANGER.
APPLICATION FILED JAN. 16, 1906.

1,023,261.

Patented Apr. 16, 1912.

2 SHEETS—SHEET 2.

Witnesses:

Inventor:
Ray H. Manson

UNITED STATES PATENT OFFICE.

RAY H. MANSON, OF ELYRIA, OHIO, ASSIGNOR TO THE DEAN ELECTRIC COMPANY, OF ELYRIA, OHIO, A CORPORATION OF OHIO.

POLE-CHANGER.

1,023,261.  Specification of Letters Patent.  Patented Apr. 16, 1912.

Application filed January 16, 1906. Serial No. 296,309.

*To all whom it may concern:*

Be it known that I, RAY H. MANSON, a citizen of the United States, residing at Elyria, in the county of Lorain and State of Ohio, have invented certain new and useful Improvements in Pole-Changers, of which the following is a specification, reference being had therein to the accompanying drawings.

My invention relates to pole changers and has for its object the production of such an instrument which shall be an improvement on those of the prior art. Although this pole changer may be used for other purposes, I have particularly designed it to be used in connection with electrical signaling systems, where tuned responsive devices are employed. In such systems, devices such as bells, whose gong clappers are placed upon a tuned vibratory reed are employed to signal subscribers or attendants. These bells respond to alternating or pulsating currents of different frequencies which are placed upon the line to operate the same. Alternating current generators or some substitute therefor, must be employed to selectively operate such signals, as in small towns and villages where no power plant is located, there is no means for running these generators.

My pole changer is adapted to convert the continuous current of electric batteries into a variable current which will operate the tuned responsive members. These pole changers operate without the need of a large power plant, such as is required for alternators. To supersede these alternators it is necessary that the pole changers should produce alternating current of exactly the right frequencies; that they should not wear or otherwise change to such a degree that the frequencies will alter and the wrong bell be operated and that they must continue this work, and above all that, they must be what is known as fool proof.

Inasmuch as alternators are expensive to construct and to operate, another aim of my invention is to produce a pole changer which is capable of the service described and which may be used in connection with other elements to do the work of alternators and which at the same time will be less expensive.

My pole changer realizes these aims and although the art covers broadly the features disclosed, I desire to cover the novel features thereof, as broadly as the state of the art will allow.

Another object of my invention is to arrange the units in such a way that substitutions may be made with as little disturbance to the other parts as possible. This is particularly advantageous with the flexible contact springs which are subject to strains which are apt to bend them out of shape, or, by their constant use, are liable to have their coefficient of flexibility changed. Hitherto, it has been customary to mount these springs on the rigid members which serve to whip them away from a contacting engagement with their coöperating contact. With this arrangement the rigid members cannot be removed and another substituted without disturbing the spring; while the spring thus riveted to the backing member cannot be readily taken off. I therefore support my springs and their backing members by a common supporting means so that though the pieces piled on top of each other may mutually contribute to each other's support, they are not dependent upon one another for support.

I mount my pole-changing set, with its transformers and condensers, in a cabinet which forms a complete portable unit in itself, and which preferably has provision also for containing primary or secondary battery cells to run the machines, if desired.

My invention is illustrated, as to one embodiment, in the accompanying drawings, in which—

Figure 4:
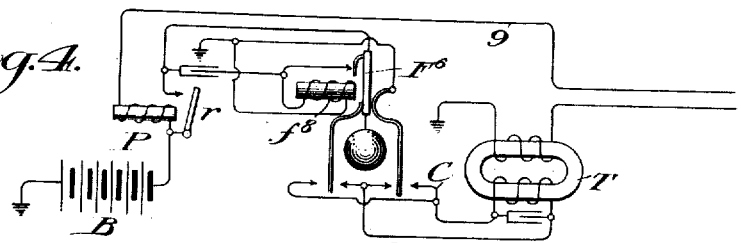
Figure 5:
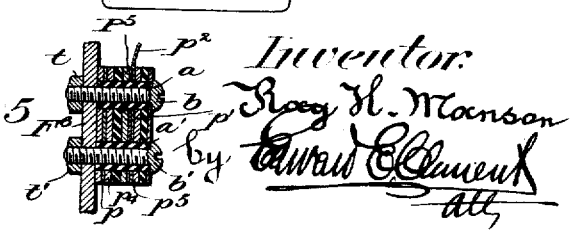
Figure 2:
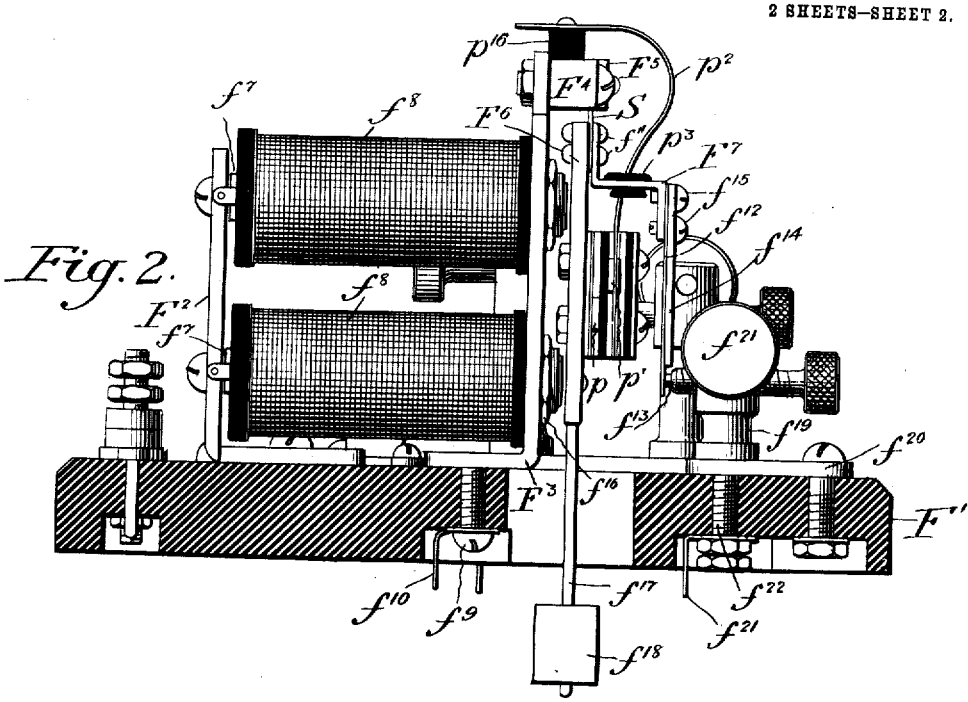
Figure 3:
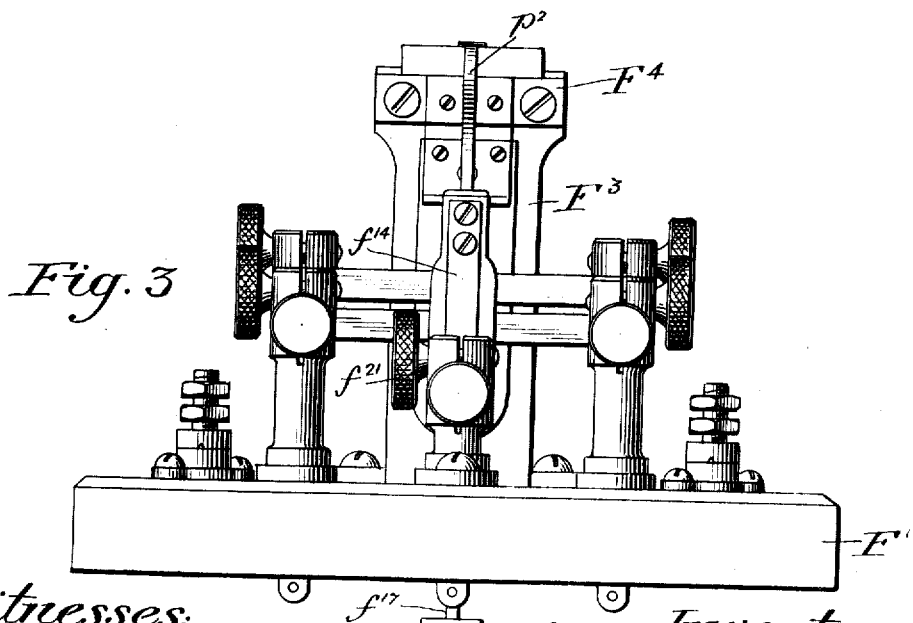

Figure 1 is a plan view of one of the pole-changing units: Figs. 2 and 3 are, respectively, a side view and a face view of the same unit, the base being shown in Fig. 2 in section; Fig. 4 is a diagram of a part of the circuit connections of a pole changer; Fig. 5 is a cross section of the springs and backing members taken along the long axis of the magnets and showing their connection to the vibratory member.

Referring now more particularly to Figs. 1, 2, 3 and 5, wherein one of the pole-changing units is shown on a large scale, F', is a heavy base of slate or other suitable material, upon which is erected the yoke frame $F^2$, carrying a pair of magnetic cores $f^7$, with windings $f^8$. The forward ends of these magnetic cores pass through and are secured to a second vertical yoke frame $F^3$, which is itself secured to the base by one or more screw-bolts $f^9$ passing up from beneath, and carrying tailed washers $f^{10}$ or other means for attaching circuit wires. It will be noted from the diagram that one side of each pair of contacts is to battery, and I preferably make these battery connections through the frame, thus simplifying the wiring very materially.

Upon the upper end of the frame $F^3$ a heavy transverse block $F^4$ is secured upon which the stiff spring S is held by the clamping plate $F^5$, preferably seated in a depression or cross groove milled out in the heavier block. I make these parts heavy and solid for a double purpose,—first, in order to have the fastenings absolutely secure, and, second, to prevent the communication of vibrations through the parts of the machine. The spring S carries the armature $F^6$, and the contact member $F^7$, which are riveted together at $f^{11}$ through the body of the spring and upon opposite faces thereof. The contact member is bent out at right angles from the plane of the armature, and upon its outer end, which is again returned at a right angle, I fasten the contact spring $f^{12}$. In order that this may yield on the back stroke when it touches the twin contact $f^{13}$, but may be rigid when the armature is drawn forward, I provide a stiff backing member $f^{14}$, which is held at its upper end to the spring and also upon the contact member $F^7$ by means of the screws $f^{15}$. The back contact $f^{13}$ for this vibratory mechanism is preferably the platinum point of a thumb screw having a milled head by means of which it may be adjusted in the post $f^{19}$ secured upon a base piece $f^{20}$, and provided with a set screw $f^{21}$, by which the contact screw may be locked. All of the contact posts in my device have split heads and set screws for this same purpose. Circuit connections to the post $f^{19}$ are effected through the tailed washer $f^{21}$ attached beneath the base to the screw bolt $f^{22}$. The plate $f^{20}$ is employed with its two screw bolts through the base, in order to prevent any possible turning of the post $f^{19}$, and consequent disarrangement of the contact $f^{13}$. The post is rigidly set in the plate by means of solder or a steady pin or a squared shoulder let into the plate. A solid construction is thus obtained which will not be disturbed by the continuous vibration of the contacts.

The parts of the apparatus thus described constitute the motor mechanism of the individual or unit pole-changer. The electromagnets $f^8$ are connected on one side to the posts $f^{19}$, and on the other side to ground, the armature and frame being to battery when the circuit is closed. In this condition the armature will be vibrated, and by properly adjusting the screw contact $f^{13}$, this vibration may be rendered uniform and smooth, and its frequency determined to a certainty by means of the pendulum bob or weight $f^{18}$. The pole changing means operated by this motor device comprises a pair of transverse springs $p$ and $p'$, the first of which is in metallic contact with the parts of the armature and frame and so to battery, while the second is to ground through a flexible spring $p^2$, passing upward through the central opening in the member $F^7$ and kept from touching the latter by means of an insulating bushing $p^3$. These springs are stiffened by metallic backing members $p^4$ and $p^5$, similar to the strips $f^{14}$ and for the same purpose; that is, each spring $p$ or $p'$ is quite flexible, but the backing strips are relatively stiff, hence the springs are permitted to give in one direction but not in the other. The springs, the backing members and the insulating segments used therewith, as shown in Fig. 2, are assembled together into a unitary structure in which positions they may be clamped together. Insulating bushings $a$ and $a'$ pass through holes in these members and serve the double purpose of insulating the springs from the bolts $p$ and $p'$ and of holding the parts together. Bolts $p$ and $p'$ pass through the bushings and when the taps $t$ and $t'$ are placed thereon serve to fasten the unit to the member $F^6$. The fastening means is then tightened up, securing the unit above described to the armature. This will appear from Figs. 2 and 5 of the drawing. It will thus be seen that the springs, backing members and the insulating segments are supported by the armature and its associate parts being each connected directly to such support and being removable from the structure without injury to the other parts and without the use of any tools other than those necessary to loosen the fastening means. I consider this an advance over the prior art where the springs have been attached to the ends of the backing members and are supported through them in such a way as to be dependent thereupon for such support. The backing members engage the springs all along the length thereof, with the exception of the contact portions which project beyond to engage the stationary contacts. The opposite ends of the springs give in opposite directions, hence the strips $p^4$ and $p^5$ are on the outside faces on one side and upon the inside faces on the other (see Fig. 1). For convenience in mounting, I assemble the springs $p$—$p'$ and their associated parts before connecting them to the armature, the alternating strips of metal and insulation being clearly shown in Fig. 2 from which it is sufficiently apparent that these parts may be put together and so held by the screw bolts shown, before they are applied to the armature.

The opposite ends of the springs $p$—$p'$ play between the platinum points of contact screws $p^6$ $p^7$ $p^8$ and $p^9$. Each of these screws is adjustably mounted in a split head post, with a set screw, similar to the post $f^{19}$ and screws $f^{21}$. All four contacts may therefore be adjusted with great accuracy, and held positively thereafter. The posts $p^{10}$—$p^{11}$, carrying the screws $p^6$—$p^7$, are mounted upon opposite ends of a plate $p^{12}$, and the posts $p^{13}$—$p^{14}$ are mounted upon a similar plate $p^{15}$. These two plates are secured to the base by means of screw bolts, in a similar manner to the plate $f^{20}$. They are connected to suitable terminals mounted on the base, and thence to opposite sides of the primary winding of one of the transformers T. Since the two springs $p$—$p'$ are connected respectively to battery and to ground, and as the contacts are adjusted so that one of the springs will make on one side and break on the other side, at the same time that the other spring breaks on the first side and makes on the other, and vice versa, it will be apparent that as the armature vibrates the springs back and forth between the contacts, battery and ground will be rapidly, simultaneously and alternately connected to the two plates $p^{12}$—$p^{15}$.

For the purpose of securing the springs $p^2$ in an efficient manner, I mount a rubber block $p^{16}$ on the top of the block $F^4$, and secure the spring upon the rubber. It is necessary to provide thorough insulation between these springs and the other parts, since the potential difference between them represents the full strength of the battery or other source of supply, and also since a ground upon the live side of the battery would not only produce disastrous results in the individual unit, but would temporarily disarrange other portions of the exchange mechanism.

In Fig. 4 I have shown the diagram of a part of the circuit arrangements. The vibratory member is shown at $F_6$. This is controlled by the magnet $f^8$ and vibrated when a pulsating current passes therethrough to open and close the primary of the transformer T. The circuits through this primary are controlled by a magnet P, which governs an armature $r$, in the circuit thereof. The circuit of the secondary of T includes the battery B and leads to the responsive devices.

From the foregoing description and statement of operation it will now be apparent that I effect the greatest economies, and attain the highest efficiency, combined with perfect precision in operation. There is nothing more accurate and more uniform in its action than a properly tuned reed or pendulum. There is no periodic vibrator which can be brought into full operation with smaller time-loss and it is to be particularly noted that this is very important, because if the ordinary rotary generator be started up in making a call, the rate of alternation will be accelerated as the machine speeds up, from zero to maximum, and as a result all the ringers on the line will be operated in succession. In my case action is so quick as to have no effect whatever on any but the one ringer which it is designed to actuate.

Many changes may be made in details of construction and in the circuit connections without departing from the spirit of my invention. It is not limited to any particular type of connective or line circuits, nor even to telephone circuits as such, and I desire my claims to be broadly construed so as to cover all non-essential variations.

Having thus described my invention, what I claim and desire to secure by Letters Patent is—

1. In a pole changer, a motor magnet, a member adapted to be vibrated thereby, a base for rigidly supporting said parts, oppositely disposed contacts supported from such base, spring contacts carried by such vibrating member and adapted to make contact at the ends with said oppositely disposed contacts when such member is vibrated, such spring contacts assembled independently of such member and constituting a removable unitary structure.

2. In a pole changer, a motor magnet, a member adapted to be vibrated thereby, a base for rigidly supporting said parts, contacts included among the pole changer parts, supported by said base, spring contacts carried by such vibrating members and each adapted to make yielding contacts and a positive break with one of said contacts supported by the base during each half cycle of such vibrating member, such vibrating contacts assembled independently of such member and constituting a removable unitary structure.

3. In a pole changer, the combination of a motor magnet, a member adapted to be vibrated thereby, a base supporting said parts, contacts supported by said base, spring contacts carried by said vibrating member and adapted to make contact with said contacts when said member is vibrated, rigid backing members associated with said spring contacts and means to clamp both said spring contacts and said backing members to said vibrating member.

4. In a pole changer, a base, a motor magnet, a pair of contacts forming an electric switch, one of which is a flexible spring, supports for said contacts connecting them to said base, one of said contacts adapted to be vibrated by said magnet together with parts of its support to open and close said switch, a rigid backing member associated with said flexible spring adapted to cause said spring to break away from the other contact with a sharp and positive break and means for clamping said spring and its associate backing member to said support.

5. In a pole changer, the combination of a base, a motor magnet, a set of contacts adapted to be vibrated thereby, another set of contacts mounted upon said base and adapted to coöperate with the first set of contacts, one set of contacts consisting of flexible springs and a plurality of rigid backing members for said spring coöperating therewith to cause a quick and positive break away from said other contacts, such spring contacts and backing members constituting a removable unitary structure.

6. In a pole changer, a base, a motor magnet, a pair of contacts forming an electric switch, one of which is a flexible spring, supports for said contacts connecting them to said base, one of said contacts adapted to be vibrated by said magnet to operate said switch, a rigid backing member associated with said flexible spring adapted to cause said flexible spring to break away from said contact with a sharp and positive break and means to connect said flexible spring and said backing member to one of said supports, said spring and member being severally connected to said support by the same fastening means.

7. In a pole changer, a base, a motor magnet, a pair of contacts forming an electric switch, one of said contacts consisting of a flexible spring, means for supporting said contacts from the base, one of said contacts adapted to be vibrated by said magnet to operate said switch, a rigid backing member for said flexible contact shorter in length than said spring and adapted to whip said spring away from said other contact to interrupt the contact therebetween sharply and positively, and means to clamp each of said springs and said member to said base.

8. In a pole changer, a motor magnet, a member adapted to be vibrated thereby, a base for rigidly supporting said parts, oppositely disposed contacts supported by said base and spring contacts carried by such vibratile member and medially supported thereby, each adapted to make contact alternately at opposite ends with said oppositely disposed contacts when such member is vibrated.

9. In a pole changer, a motor magnet, a member adapted to be vibrated thereby, a base for rigidly supporting said parts, oppositely disposed contacts supported by said base, and a spring contact carried by such vibratile member and medially supported thereby, such contact adapted to make contact alternately at opposite ends with said oppositely disposed contacts when such member is vibrated.

10. In a pole changer, a base, a motor magnet, a pair of contacts forming an electric switch, one of which is a flexible spring, supports for said contacts connecting them to said base, one of said contacts adapted to be vibrated by said magnet together with parts of its support to open and close said switch, a rigid backing member associated with said flexible member preventing the flexing of said spring to the side upon which the backing member is placed and joint means for clamping said spring and backing member to said support.

11. In a pole changer, a base, a motor magnet associated with said base, a contact on said base, a flexible spring contact on said base, contact supports on said base, said contacts constituting an electric switch, one of said contacts adapted to be vibrated by said magnet with a part of its support to open and close said switch, a rigid backing member associated with said flexible spring contact to cause it to open said switch with a positive break during each half-cycle of said vibrating parts, said spring contact and said rigid member being perforated, and fastening means inserted through said perforations to attach said members to their support.

In testimony whereof I affix my signature in presence of two witnesses.

RAY H. MANSON.

Witnesses:
A. D. T. LIBBY,
S. A. BEYLAND.